(12) United States Patent
Blais et al.

(10) Patent No.: US 8,904,636 B2
(45) Date of Patent: Dec. 9, 2014

(54) METHOD OF FABRICATING INTEGRALLY BLADED ROTOR USING SURFACE POSITIONING IN RELATION TO SURFACE PRIORITY

(75) Inventors: Mario Blais, Varennes (CA); Michel Bellerose, Ste-Julie (CA)

(73) Assignee: Pratt & Whitney Canada Corp., Longueuil, Quebec (CA)

(*) Notice: Subject to any disclaimer, the term of this patent is extended or adjusted under 35 U.S.C. 154(b) by 216 days.

(21) Appl. No.: 13/188,535

(22) Filed: Jul. 22, 2011

(65) Prior Publication Data

US 2013/0019476 A1    Jan. 24, 2013

(51) Int. Cl.
*B21D 53/78*    (2006.01)

(52) U.S. Cl.
CPC ........................ *B21D 53/78* (2013.01)
USPC ............... 29/889.21; 29/407.01; 318/632; 33/503; 33/551

(58) Field of Classification Search
CPC ........ B23P 15/006; B23P 19/04; B23P 6/005; B23P 6/002; F01D 5/3061; F01D 5/34; F01D 25/285; B29C 66/90; F05B 2230/60; G05B 19/4103; G05B 19/23; G05B 9/4097; B23K 2201/001
USPC ............... 29/889.21, 407.09, 407.1, 23.51; 700/186, 193; 702/155
See application file for complete search history.

(56) References Cited

U.S. PATENT DOCUMENTS

| | | | |
|---|---|---|---|
| 2,454,580 A * | 11/1948 | Thielemann | 29/889.21 |
| 3,627,997 A | 12/1971 | Samuels et al. | |
| 3,890,062 A | 6/1975 | Hendrix et al. | |
| 4,694,230 A * | 9/1987 | Slocum et al. | 318/568.17 |
| 5,021,941 A | 6/1991 | Ford et al. | |
| 5,055,752 A | 10/1991 | Leistensnider et al. | |
| 5,109,606 A * | 5/1992 | DeMichael et al. | 29/889.1 |
| 5,282,261 A | 1/1994 | Skeirik | |
| 5,286,947 A | 2/1994 | Clyde et al. | |
| 5,369,870 A | 12/1994 | Ouchi et al. | |
| 5,383,593 A * | 1/1995 | Lechervy et al. | 228/182 |
| 5,428,201 A | 6/1995 | Kaneko et al. | |
| 5,523,953 A | 6/1996 | Araie et al. | |
| 5,571,426 A | 11/1996 | Akemura | |
| 5,649,063 A | 7/1997 | Bose | |
| 5,664,066 A | 9/1997 | Sun et al. | |
| 5,831,407 A | 11/1998 | Ouchi et al. | |
| 6,041,500 A * | 3/2000 | Terpstra | 29/889.21 |
| 6,219,916 B1 * | 4/2001 | Walker et al. | 29/889.21 |
| 6,438,838 B1 * | 8/2002 | Meier et al. | 29/889.1 |
| 6,453,211 B1 | 9/2002 | Randolph, Jr. et al. | |
| 6,471,474 B1 | 10/2002 | Mielke et al. | |
| 6,478,539 B1 | 11/2002 | Trutschel | |

(Continued)

FOREIGN PATENT DOCUMENTS

WO      93/23820      11/1993
WO      2009/106830      9/2009

*Primary Examiner* — David Bryant
*Assistant Examiner* — Jun Yoo
(74) *Attorney, Agent, or Firm* — Norton Rose Fulbright Canada LLP

(57) ABSTRACT

A method of fabricating an integrally bladed rotor for gas turbine engines according to one aspect includes a step of positioning a blade on a hub in a joining procedure by using a priority surface of the blade as a reference surface. The priority surface is determined in relation to importance of surface functionality of the blades during engine operation.

7 Claims, 3 Drawing Sheets

(56) References Cited

U.S. PATENT DOCUMENTS

| | | |
|---|---|---|
| 6,524,070 B1 | 2/2003 | Carter |
| 6,850,874 B1 | 2/2005 | Higuerey et al. |
| 6,905,310 B2 | 6/2005 | Kawamoto et al. |
| 6,912,446 B2 | 6/2005 | Wang et al. |
| 6,975,918 B2 | 12/2005 | Bender |
| 7,099,737 B2 | 8/2006 | Suh et al. |
| 7,310,588 B2 | 12/2007 | Mentz et al. |
| 7,366,583 B2 | 4/2008 | Burgess et al. |
| 7,377,037 B2 | 5/2008 | Ouellette et al. |
| 7,472,478 B2 | 1/2009 | Graham et al. |
| 7,559,728 B2 | 7/2009 | Meier et al. |
| 7,634,854 B2 | 12/2009 | Meier |
| 7,637,010 B2 | 12/2009 | Burgess et al. |
| 7,704,021 B2 | 4/2010 | Hollmann et al. |
| 7,784,183 B2 * | 8/2010 | Rockstroh et al. ......... 29/889.71 |
| 7,797,828 B2 | 9/2010 | Beeson et al. |
| 7,992,761 B2 | 8/2011 | Baumann et al. |
| 8,100,655 B2 | 1/2012 | Stone et al. |
| 8,103,375 B2 | 1/2012 | Ouellette et al. |
| 8,214,080 B2 * | 7/2012 | Petterson ...................... 700/245 |
| 2005/0004684 A1 | 1/2005 | Cribbs |
| 2008/0105094 A1 | 5/2008 | McMurtry et al. |
| 2008/0250659 A1 * | 10/2008 | Bellerose et al. ............ 33/1 MP |
| 2009/0282680 A1 | 11/2009 | Kappmeyer et al. |
| 2010/0023157 A1 | 1/2010 | Burgess et al. |
| 2010/0241264 A1 | 9/2010 | Graham et al. |
| 2010/0251546 A1 | 10/2010 | Rockstroh et al. |
| 2011/0180521 A1 | 7/2011 | Quitter et al. |
| 2012/0138586 A1 | 6/2012 | Webster et al. |

\* cited by examiner

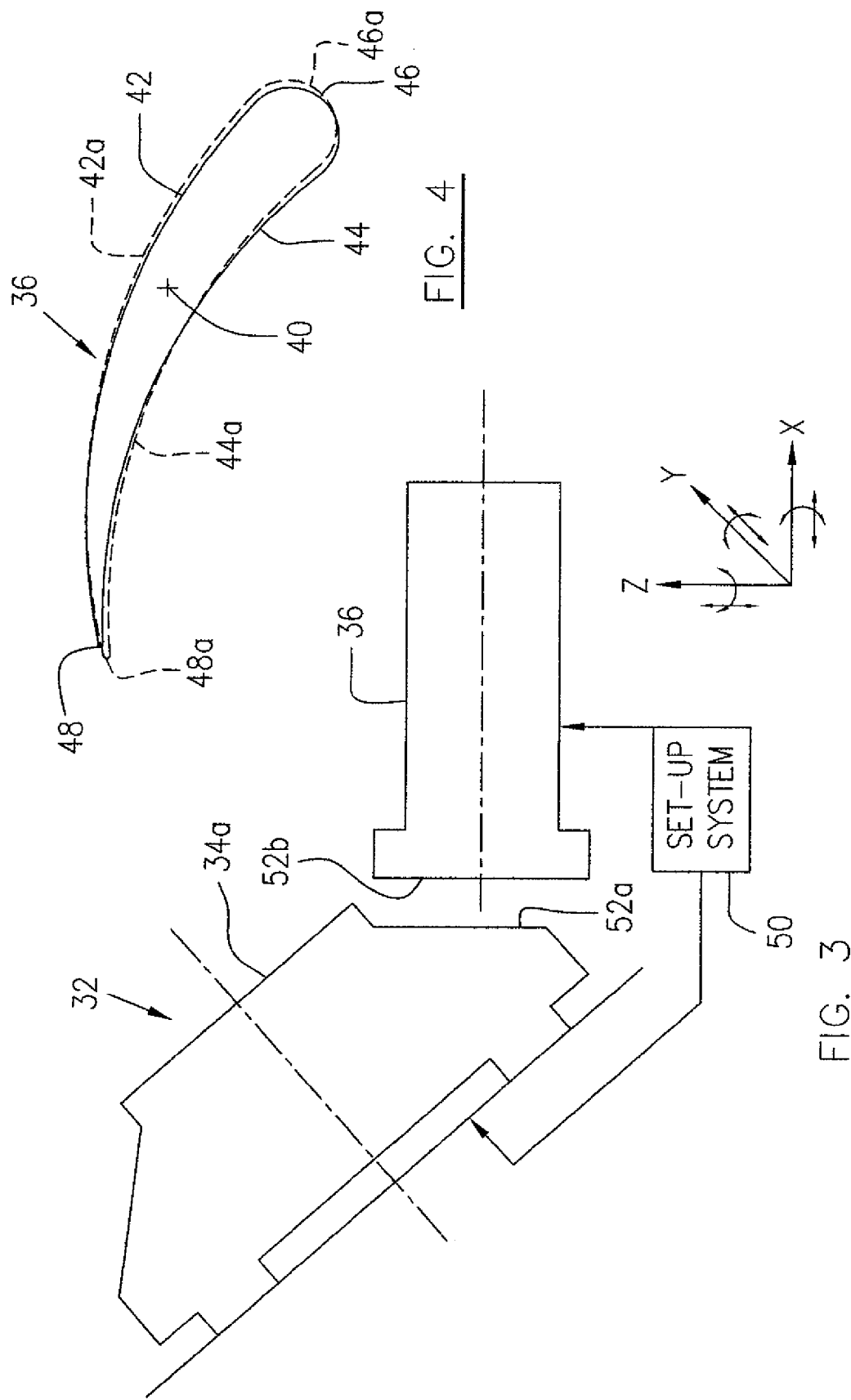

METHOD OF FABRICATING INTEGRALLY BLADED ROTOR USING SURFACE POSITIONING IN RELATION TO SURFACE PRIORITY

TECHNICAL FIELD

The described subject matter relates generally to gas turbine engines and more particularly, to an improved method of fabricating integrally bladed rotors of a gas turbine engine.

BACKGROUND OF THE ART

Integrally bladed rotors (IBR's), also commonly known as "bladed discs", are important parts of gas turbine engines. An IBR generally has a disc or hub with an array of blades affixed thereto. The blades extend radially outwardly and are circumferentially spaced apart. The airfoil surfaces of each blade define a complex geometry in order to provide desired aerodynamics. IBR's are used in gas turbine engines, for example as fan rotors which may also be referred to as "IFR's", compressor rotors or turbine rotors which rotate at high speeds during engine operation either to provide high speed and high pressure gas air flow or to generate power. The accuracy of the complex geometry of the airfoil surfaces of IBR's is important to ensure engine performance. However, it is challenging to achieve the accuracy of the complex geometry of the airfoils of IBR's, due to manufacturing tolerances. For example, when the blades are joined to the hub in a welding process, a reference surface of a blade which is used to define the position of the blade on the hub, can vary up to the addition of positioning tolerance and other manufacturing tolerances of the blade, resulting in deviation of finished surfaces of the blade from the required geometry defined by designed nominal surfaces of the blade. This will affect the performance of the rotors and thus the engine.

Accordingly, there is a need to provide an improved method of fabricating IBR's to minimize IBR geometry variations.

SUMMARY

In accordance with one aspect, the described subject matter provides a method of fabricating an integrally bladed rotor of a gas turbine engine, the integrally bladed rotor including a hub with an array of airfoil blades welded to the hub, the method comprising a) selecting a finished surface of the respective blades as a reference surface for positioning the respective blades in a welding process; b) positioning the respective blades onto the hub such that a position of the selected reference surface of the respective blades on the hub is defined in accordance with design data of a corresponding nominal surface of the integrally bladed rotor; and c) welding the respectively positioned blades to the hub.

In accordance with another aspect, the described subject matter provides a method of fabricating an integrally bladed rotor of a gas turbine engine, the integrally bladed rotor including a hub with an array of airfoil blades welded to the hub, the method comprising a) determining a priority surface of the respective blades in relation to importance of surface functionality of the blades during engine operation; b) positioning the respective blades onto the hub by using the determined priority surface of the blades as a reference surface in order to locate a position of the respective blades on the hub; and c) welding the respectively positioned blades to the hub.

Further details of these and other aspects of the described subject matter will be apparent from the detailed description and drawings included below.

BRIEF DESCRIPTION OF THE DRAWINGS

Reference is now made to the accompanying drawings depicting aspects of the described subject matter, in which:

FIG. 3 is a schematic illustration of an IBR during fabrication, showing a blade being positioned on a hub of the IBR according to one embodiment; and FIG. 4 is a cross-sectional view of a blade taken along line 4-4 in FIG. 2, showing in exaggerated dimensions, variations between designed nominal surfaces and actual finished surfaces of the airfoil blade resulting from manufacturing tolerances.

It should be noted that throughout the appended drawings, like features are identified by like reference numerals.

DETAILED DESCRIPTION

Figure 1:
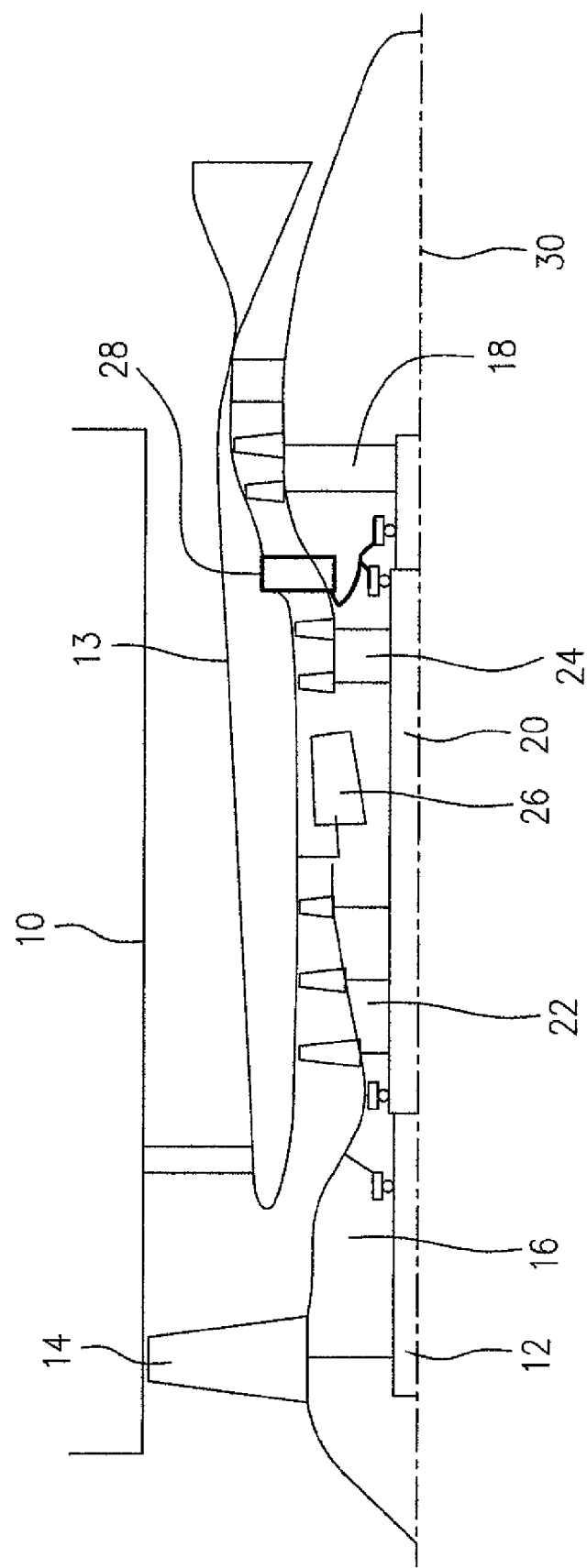
FIG. 1 is a schematic cross-sectional view of a turbofan gas turbine engine illustrating an exemplary application of the described subject matter.

Referring to FIG. 1, a turbofan gas turbine engine which is an exemplary application of the described subject matter includes a fan case 10, a core case 13, a low pressure spool assembly (not indicated) which includes a fan assembly 14, a low pressure compressor assembly 16 and a low pressure turbine assembly 18 connected by a shaft 12, and a high pressure spool assembly (not indicated) which includes a high pressure compressor assembly 22 and a high pressure turbine assembly 24 connected by a turbine shaft 20. The core case 13 surrounds the low and high pressure spool assemblies to define a main fluid path (not indicated) therethrough. The high and low pressure spool assemblies co-axially define a rotating axis 30 of the engine. A combustor 26 generates combustion gases in the main fluid path to power the high and low pressure turbine assemblies 24, 18 in rotation about the rotating axis 30. A mid turbine frame 28 is disposed between the high pressure turbine assembly 24 and the low pressure turbine assembly 18.

Figure 2:
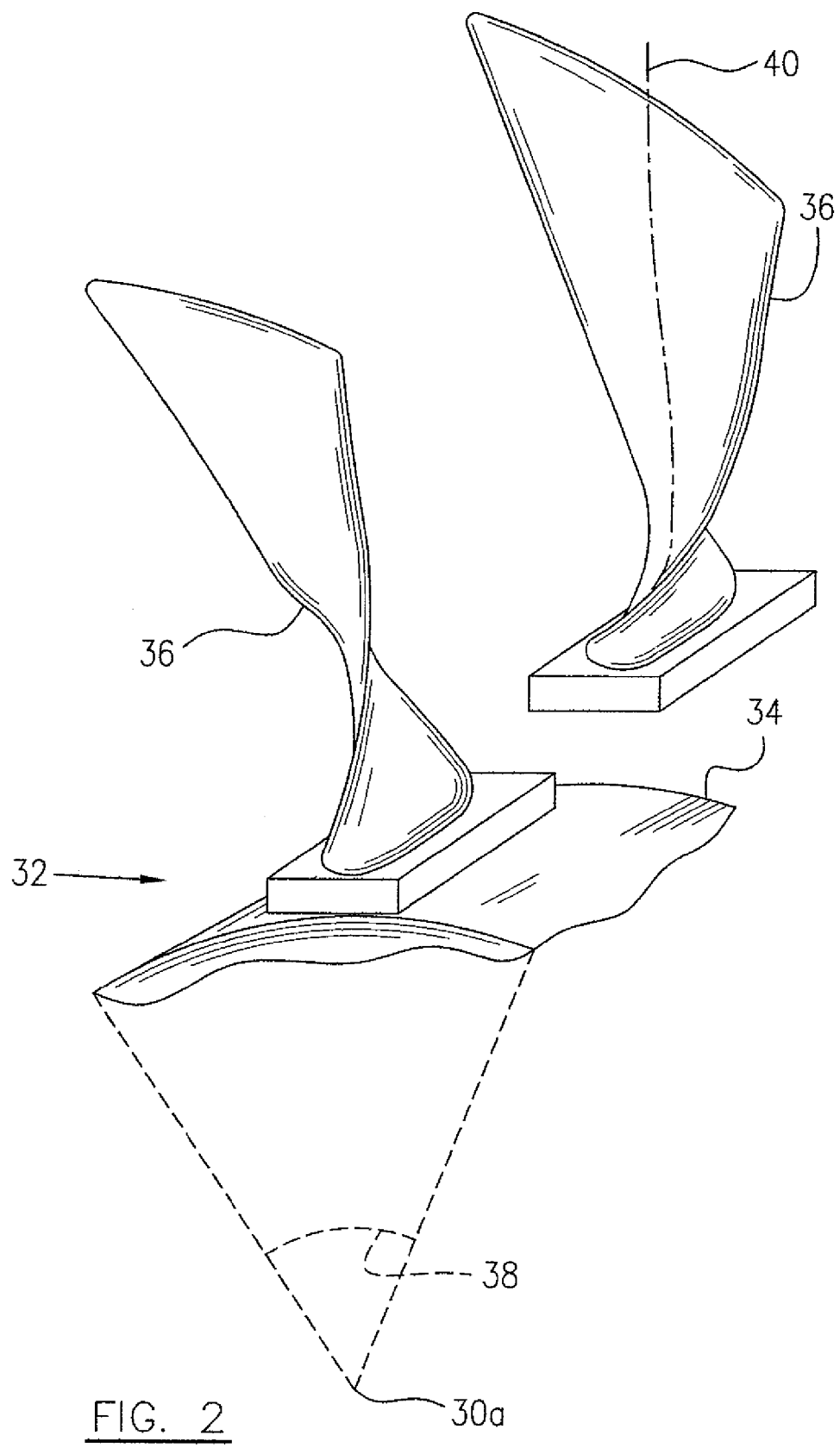
FIG. 2 is a partial perspective view of an IBR in fabrication showing a second blade being positioned on a hub of an IBR to be welded thereto.

Referring to FIGS. 1, 2 and 4, an integrally bladed rotor 32 is fabricated according to one embodiment for use as a rotor in any one of the fan assembly 14, low pressure compressor assembly 16, high pressure compressor assembly 22, low pressure turbine assembly 18 and the high pressure turbine assembly 24 of the engine. The integrally bladed rotor 32 includes a hub 34 which is partially shown in FIG. 2 with an array of blades 36 affixed to the periphery of the hub 34 (only one blade shown being affixed to the hub). The blades 36 stand radially outwardly from the hub 34 and are circumferentially spaced apart one from another. The integrally bladed rotor 32 has a central hole which is partially shown in broken lines 38, axially extending through the hub 34 for receiving the shaft 12 or 20 therein when the integrally bladed rotor 32 is installed in the engine. A geometric center 30a of the central hole 38 in the hub 34 superposes the rotating axis 30 of the engine within acceptable tolerances when the integrally bladed rotor 32 is installed in the engine. Therefore, the center point 30a of the central hole 38 of the integrally bladed rotor 32, is used as a reference point representing the rotating axis 30 of the engine in the integrally bladed rotor 32 design and fabrication.

The hub 34 and the individual blades 36, according to one embodiment, are individually fabricated and the individual blades 36 are then welded to the periphery of the hub 34 in a designed blade array pattern. The individual blades 36 are designed, for example in a computer aided design (CAD) program which generates a drawing of the blade with a stacking line 40 at a designated position which determines all positions of the functional surfaces of the blade in the engine. The individual blades are supposed to be accurately identical. However, due to fabrication tolerances, the actually finished surfaces such as finished suction side surface 42a, pressure side surface 44a, leading edge surface 46a and trailing edge surface 48a, may vary from the corresponding ideal nominal surfaces 42, 44, 46 and 48 of the individual blades 36.

In a conventional welding process such as a linear friction welding (LFW) process in which the individual blades 36 are welded to the hub 34, one of the nominal surfaces (not numbered) of each blade 36 is selected as a reference surface of that blade 36 for positioning the blade with respect to the hub 34 according to design data presented in the drawings (not shown). However, as shown in FIG. 4, the actual finished surfaces of each blade 34 may differ from the corresponding nominal surfaces due to fabrication tolerances in addition to positioning tolerances of each blade 36 in the LFW operation. Therefore, when the blades 36 are joined to the hub 34, the variation in position/orientation of the actual finished surface of the selected reference surface of each blade 36, can deviate up to the accumulation of the various tolerances in blade fabrication and positioning in the LFW operation. In order to minimize this deviation, the actual finished surface rather than the nominal surface of each blade 36 according to one embodiment, is used as the selected reference surface of the respective blade 36 in order to define the position of the reference surface of the blade 36 in relation to the design data of the blade design drawing, for positioning the blade 36 with respect to the hub 34 in the LFW operation. Therefore, stack up tolerances in blade positioning will be reduced to a minimum.

According to another aspect, a priority surface of the respective blades 36 is determined in relation to importance of surface functionality of the blades 36 in engine operation and the determined priority surface of the respective blades 36 may be used as a reference surface to locate a position of the respective blades 36 on the hub 34 in the LFW procedure.

When a finished surface, for example the suction side surface 42a of a blade 36 instead of the nominal surface 42 at the suction side of the blade 36 is used as a reference surface in order to position the blade onto the hub 34 in the LFW procedure, the finished suction side surface 42a in the integrally bladed rotor 32 will be in a position relative to the hub 34 defined substantially in accordance with the nominal surface design data of the determined priority surface of the blade in the integrally bladed rotor, as presented in the CAD design drawing. In other words, the finished suction side surface 42a will have a most accurate position, perhaps with an acceptable positioning tolerance in the integrally bladed rotor 32, thereby providing aerodynamic performance closest to the designed functionality.

Nevertheless, other finished surfaces such as a finished pressure side surface 44a, finished leading edge surface 46a or finished trailing edge surface 48a follows the finished suction side surface 42a in the positioning step of the LFW procedure. Therefore, the finished surfaces 44a, 46a and 48a will not be as close to respective positions defined by the design data of their corresponding nominal surfaces 44, 46 and 48 as presented in the design drawing, as the finished suction side surface 42a as the reference surface is to the nominal suction side surface 42, considering the fabrication tolerances between the respective finished surfaces and their corresponding nominal surfaces. Therefore, the aerodynamic performance of these finished surfaces of the blade may be somewhat affected during engine operation. Accordingly, the priority surface of the blade used as a reference surface in the positioning step of the LFW procedure, may be determined in accordance with the importance of surface functionality of the blade. In different engine designs, priority considerations may vary and therefore, for example, the finished pressure side surface 44a, finished leading edge surface 46a or finished trailing edge surface 48a may be determined as a priority surface in different engine designs.

Referring to FIGS. 3 and 4, a set up system 50 according to one embodiment may be used in a LWF procedure to adjust a position of the respective blades 36 to a hub 34a (which is schematically illustrated in a configuration similar to but not exactly the same as the hub 34 shown in FIG. 2). The set-up system 50 is capable of adjusting the position of each blade 36 in six dimensional degrees as indicated by the arrows relating to an X/Y/Z coordinate system. The set-up system 50 may be incorporated into a welding machine designed for an LFW procedure of an integrally bladed rotor 32, or may be implemented as an additional fixture apparatus which is used for positioning and holding each of the respective blades 36 and the hub 34a in position during the LFW operation. When the hub 34a and one of the blades 36 are both secured on the set-up system 50, the set-up system 50 allows the blade 36 to be moved along X axis which is perpendicular to joining surface 52a of the hub 34a, until joining surface 52b of the blade 36 reaches the joining surface 52a of the hub 34a. The set-up system 50 also allows small offsets of the blade 36 in the direction of axes Y and Z which are parallel to the joining surface 52a of the hub 34a and allows a minor rotation about each of the axis X, Y, Z in order to position a finished surface such as the suction side surface 42a of the blade 36 (which for example, has been determined as a priority surface of the blade in accordance with importance of blade functionality in this particular engine design) in the best position/orientation on the hub 34a in accordance with the design data of the nominal suction side surface 42 presented in the design drawing of the integrally bladed rotor 32. Once the blade 36 is positioned on the hub 34a in the best position/orientation, the set-up system 50 holds both the hub 34a and the blade 36 in position and the LFW step is then conducted to weld the blade 36 to the hub 34a. The above described steps may be repeated to position and then weld the respective remaining blades 36 on the hub 34a.

The above description is meant to be exemplary only, and one skilled in the art will recognize that changes may be made to the embodiments described without departure from the scope of the described subject matter. For example, the described method is not limited to any particular integrally bladed rotor configuration such as that which is illustrated in the drawings, but may apply to many different types of rotor configurations. The described method is not limited to LFW welding operations but may apply to other joining procedures for attachment of the respective blades to a hub. Still other modifications which fall within the scope of the described subject matter will be apparent to those skilled in the art, in light of a review of this disclosure, and such modifications are intended to fall within the appended claims.

The invention claimed is:

1. A method of fabricating an integrally bladed rotor of a gas turbine engine, the integrally bladed rotor including a hub with an array of airfoil blades welded to the hub, each of the airfoil blades having respective positions of nominal aerodynamic-functional surfaces of each blade with respect to the hub, aerodynamic-functional surfaces of the blades directing a fluid flow during engine operation, the method comprising:

a) selecting an entire finished aerodynamic-functional surface of the respective blades as a reference surface for positioning the respective blades in a welding process;

b) positioning the respective blades onto the hub based on one requirement in which a position of the selected reference surface of the respective blades on the hub is defined in accordance with design data of only one corresponding entire nominal aerodynamic-functional surface of the integrally bladed rotor; and c) welding the respectively positioned blades to the hub.

2. The method as defined in claim 1 wherein step (a) is conducted by determining a priority aerodynamic-functional surface of the respective blades with respect to importance of surface functionality of the blades during engine operation, an entire finished surface of the determined priority aerodynamic-functional surface being selected as the reference surface.

3. The method as defined in claim 1 wherein an entire finished surface on a suction side of the respective blades is selected as the reference surface.

4. The method as defined in claim 1 wherein an entire finished surface on a pressure side of the respective blades is selected as the reference surface.

5. The method as defined in claim 1 wherein an entire finished surface on a leading edge of the respective blades is selected as the reference surface.

6. The method as defined in claim 1 wherein an entire finished surface on a trailing edge of the respective blades is selected as the reference surface.

7. The method as defined in claim 1 wherein step (b) is conducted using a set-up system to adjust a position of the respective blades with respect to the hub, the set-up system being capable of adjusting the position of each of the blades in 6 dimensional degrees.

* * * * *